United States Patent [19]

Khoudari

[11] 4,361,895
[45] Nov. 30, 1982

[54] MANCHESTER DECODER

[75] Inventor: Benjamin M. Khoudari, Great Neck, N.Y.

[73] Assignee: Ontel Corporation, Woodbury, N.Y.

[21] Appl. No.: 172,742

[22] Filed: Jul. 28, 1980

[51] Int. Cl.³ .......................... H04J 3/06; H04L 7/00
[52] U.S. Cl. ...................................... 375/87; 329/50; 375/94; 360/44
[58] Field of Search ...................... 375/55, 86, 87, 94, 375/95, 110; 360/42, 43, 44; 328/72, 73, 109; 329/50

[56] References Cited

U.S. PATENT DOCUMENTS

| | | | |
|---|---|---|---|
| 3,402,264 | 9/1968 | Ellis | 375/110 |
| 3,967,061 | 6/1976 | Dobias | 375/110 |
| 3,967,062 | 6/1976 | Dobias | 375/110 |
| 3,980,825 | 9/1976 | Morrien | 328/155 |
| 4,080,572 | 3/1978 | Hastings et al. | 375/95 |
| 4,112,383 | 9/1978 | Burgert | 375/87 |
| 4,124,778 | 11/1978 | Amass | 375/55 |
| 4,146,743 | 3/1979 | Raynham | 375/110 |
| 4,242,755 | 12/1980 | Gavzan | 375/87 |

OTHER PUBLICATIONS

D. J. Morris, 'Code Your Fiber-Optic Data for Speed without Losing Circuit Simplicity', Oct. 25, 1978, Electronic Design, vol. 27, No. 5, pp. 110–116.
Norton, J. J., 'Drop Your Costs, but not Your Bit with Manchester-Data Decoder', Jul. 19, 1979, Electronic Design, vol. 27, No. 15, pp. 110–116.

Primary Examiner—Benedict V. Safourek
Assistant Examiner—Stephen Chin
Attorney, Agent, or Firm—Beveridge, DeGrandi & Kline

[57] ABSTRACT

A decoder for Manchester encoded data. Each mid-bit transition of the Manchester encoded data is detected and used to activate a counter which counts pulses from a local clock having a pulse rate eight times the data bit rate. The sixth pulse thus occurs at a point one-fourth of a data bit interval after the start of the next data bit interval. At that point the Manchester encoded data is sampled. Since the clock utilized to produce the Manchester encoded data is at a logic level zero at the sampling time, the sampled logic level of the Manchester data is the same as the logic level of the original data. The sampled logic level is used to recreate the original data level, and so the recreated pulse waveform is of the same wave shape as the original data pulse waveform but lags the original by one-fourth a data bit interval.

5 Claims, 7 Drawing Figures

MANCHESTER DECODER

BACKGROUND OF THE INVENTION

The present invention pertains to data decoding. More particularly, the present invention pertains to a system and a technique for decoding Manchester encoded data.

Digital data is frequently transmitted considerable distances over transmission links such as radio links or wire connections. At the receiving end, the data must be recovered from a signal which frequently includes noise, in the form of extraneous pulses, and jitter, in the form of pulses delayed or ahead of their proper time position. Such noise and jitter can introduce errors into the received data, since the noise and jitter might be interpreted erroneously as a data pulse. A significant problem in conventional data transmission schemes is the absence of a clock at the receiving station. Without a clock, the beginning or the end of an incoming data bit cannot be accurately identified, and the width of a bit cell or even the order of incoming data cannot be accurately determined. Furthermore, binary data contain a D.C. component which depends upon the bit pattern. If a long string of binary ones is transmitted, the receiving station gets a D.C. level which could last for several seconds. Many types of receiving equipment cannot handle this D.C. or zero frequency signal. Expensive additional circuitry is necessary to accommodate the D.C. level.

Manchester data transmission overcomes the problems of lack of a clock signal at the receiving station and of the D.C. level. In Manchester data transmission, the data are combined at the transmitting station with a bit-rate clock to provide two bits of output data for a single input bit. This is frequently accomplished by applying the original data and the clock signal to an exclusive-OR gate, the output of which is the Manchester encoded data. Logic level zero data are represented by a binary zero during the first half of a bit interval and by a binary one during the second half. Conversely, logic level one data, being the complement of logic zero data, are just the opposite, being represented by a binary one during the first half of a bit interval and by a binary zero during the second half. This yields a 50% duty cycle. Document 106-73 of the Inter-Range Instrumentation Group (IRIG) Telemetry Standards sets forth further information with regard to Manchester data.

While Manchester encoded data avoids the D.C. or zero frequency signal problem, still noise and jitter can occur. At the receiving station, the noise must be eliminated and the jitter corrected in order to assure that the decoded data corresponds with the original data. There are two widely known approaches to decoding of Manchester data. The first involves recreating the clock exactly from the Manchester data and combining it in an exclusive-OR circuit with the Manchester data to obtain the original data. This approach is discussed in the article "Drop Your Costs, But Not Your Bits With a Manchester-data Decoder," by Jerry J. Norton, *Electronic Design*, Vol. 27, No. 15, page 110, July 19, 1979. While in theory this is a simple method, in practice it is difficult and it requires a large number of components to implement satisfactory circuitry. The clock that must be recreated from the data must be exactly in phase with the incoming data at all times. Jitter on the incoming signal makes this impossible. The resulting recreated data will have spikes as a result of the phase difference. In addition, if the data system has a different response time for a binary zero to binary one transition than for a binary one to binary zero transition, an asymmetrical clock component will be imbedded in the incoming Manchester data. The recreated clock is not exact, thus not asymmetrical, and so spikes occur on the recreated data. Any noise coming with the Manchester data will be passed through to the recreated data.

Since a logic level zero in the original data always is represented in the Manchester data by a binary zero during the first half of a bit interval and by a binary one during the second half, and since a logic level one in the original data similarly is represented by a binary one during the first half of a bit interval and by a binary zero during the second half, there is always a transition, either from binary zero to binary one or from binary one to binary zero, at each mid-bit position in the Manchester data. The second widely used method of decoding the Manchester data is to determine the direction of these mid-bit transitions, that is, whether they are binary zero to binary one transitions or binary one to binary zero transitions. This approach is discussed in the article "Code Your Fiber-Optic Data for Speed, Without Losing Circuit Simplicity," by D. J. Morris, *Electronic design*, Vol 26, No. 22, page 84, Oct. 25, 1978.

The direction of the mid-bit transition indicates whether the original data is a logic level zero or a logic level one. A binary zero to binary one mid-bit transition indicates a logic level zero in the original data, and a binary one to binary zero transition indicates a logic level one in the original data. While this technique for decoding Manchester data may appear simple to implement, it is more susceptible to noise and jitter than is desirable. To overcome noise problems a window is created during which the mid-bit transition must occur. Nevertheless, any noise occurring during that window will create both a binary zero to binary one transition and a binary one to binary zero transition. Consequently, any noise occurring during this window has at least a 50% likelihood of causing an error in the decoded data. If the window is made more narrow to reduce the likelihood of receiving noise, jitter in the incoming signal may cause the mid-bit transition to fall outside the window, again causing an error. Filtering in an attempt to remove noise may increase jitter, and thus the feasibility of using filtering is limited.

SUMMARY OF THE INVENTION

The present invention is a method of and a circuit for decoding Manchester encoded data which overcomes the problems of known techniques. In accordance with the present invention, the received Manchester data is sampled at a point approximately one-fourth of the bit length into each received data bit; that is about one-fourth of a data bit interval after the start of the bit interval. At the sampling time the clock signal is always at its low level, and so rather than applying the sampled Manchester data and the clock signal to an exclusive-OR circuit, it is only necessary to know the level of the Manchester data in order to determine the level of the original data. That is, at the sampling time if the Manchester data is a logic level zero, then at that time the recreated original data should become, or should remain, a logic level zero, and if the sampled Manchester data is a logic level one, then the recreated data should become, or remain, a logic level one. Thus, in accordance with the present invention the logic level of the recreated data stream is caused to be the same as the logic level of the Manchester data at each sampling point. This technique results in accurate recovery of the original data even with jitter up to 25% of the data bit length. In addition, the local oscillator at the receiving station can be out of phase with the transmitting station oscillator by an amount up to 25%; the sum of local oscillator drift and jitter totaling up to 25%. Only noise present at exactly the sampling time creates an error in the recovered data. The decoding circuit is synchronized with the mid-bit transitions, and this synchronization takes place at the first mid-bit transition following the first transition in the original data. The decoder of the present invention can be mechanized with a comparatively small number of components, which preferably are selected to have low power requirements.

In the Manchester data decoder of the present invention, each binary transition of the received Manchester data is detected and stored. A local clock having a frequency eight times greater than the data bit rate is applied to a counter which, after the transition is detected, counts a number of local clock cycles sufficient to locate the next one-fourth data bit-length location and then enables a latch to sample the received Manchester data. The latch output thus comprises the recreated data stream and has a logic level at each sampling point the same as the logic level of the Manchester data at the sampling points. The resulting waveform from the latch recreates the original date with a delay of one-fourth bit length.

BRIEF DESCRIPTION OF THE DRAWINGS

These and other aspects and advantages of the present invention are more apparent from the following detailed description and claims, particularly when considered in conjunction with the accompanying drawings in which like parts bear like reference numerals. In the drawings:

DETAILED DESCRIPTION OF THE PREFERRED EMBODIMENT

Figure 1:
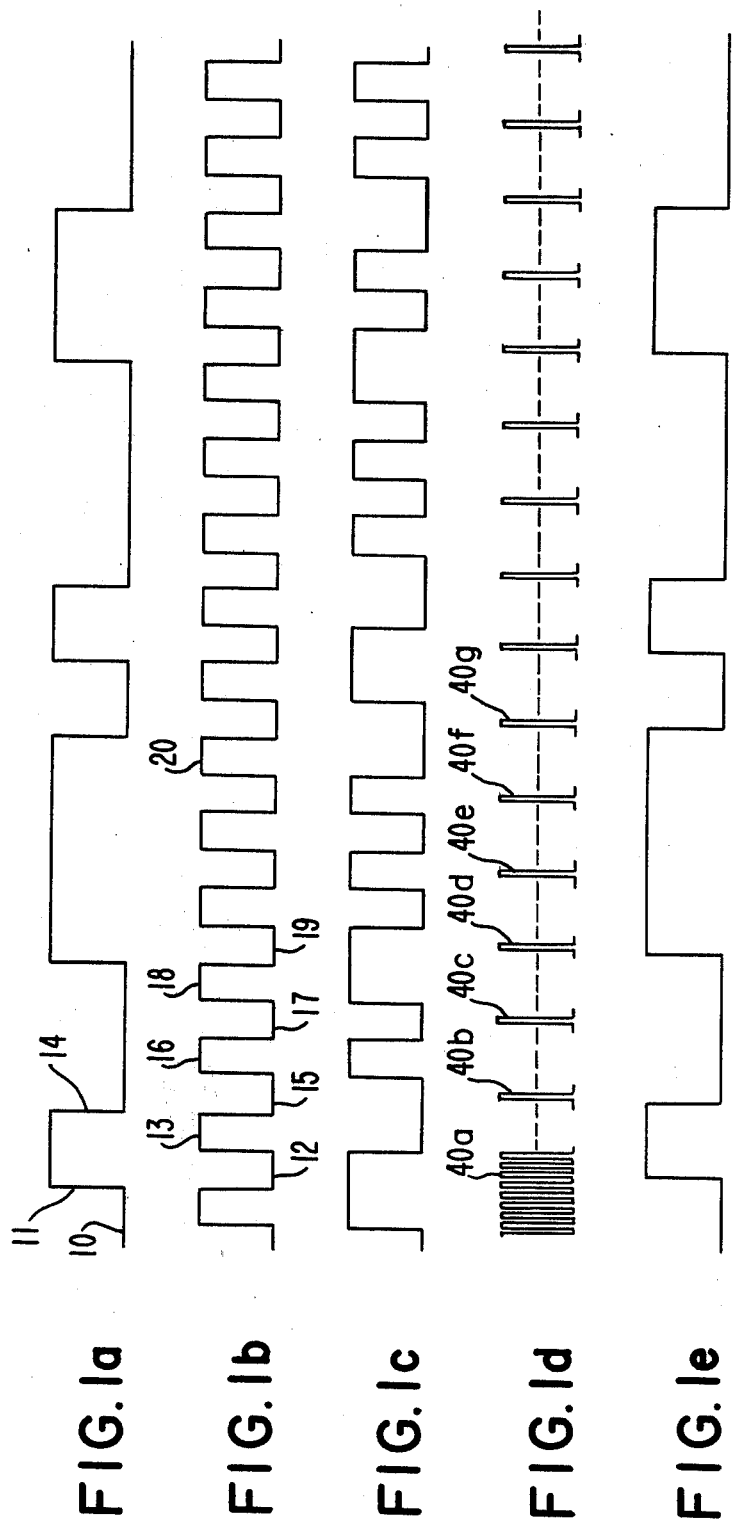
FIGS. 1a through 1e depict waveforms useful in explaining the invention.

Manchester encoded data can be obtained from a conventional data stream by passing the data stream and a clock signal having a period equal to the conventional data stream bit rate through an exclusive-OR circuit. FIG. 1a depicts a conventional data stream. Initially, at point 10, the data stream is a logic level zero. At the start of the next data interval 11 the data change to a logic level one. FIG. 1b depicts clock pulses of a period equal to the bit rate of the data of FIG. 1a. Data interval 11 commences at the beginning of the clock period initiated by zero level clock pulse 12. Data interval continues through one level clock pulse 13. The next data interval 14 commences with zero level clock pulse 15 and continues through one level clock pulse 16. In the data stream depicted in FIG. 1a, during data interval 14 the data returns to a logic level zero. The zero bit 14 is followed by a second zero bit, during zero level clock pulse 17 and one level clock pulse 18. During the next three data intervals, starting with zero level clock pulse 19 and running through one level clock pulse 20, the data are at a logic level one. As can be seen from FIGS. 1a and 1b, each data interval continues through a zero level clock pulse and a one level clock pulse, and during each data interval, the data is represented by either a logic level zero or a logic level one.

The data stream of FIG. 1a and the clock signal of FIG. 1b are applied to an exclusive-OR circuit to obtain the Manchester encoded data stream which is depicted in FIG. 1c. Just prior to data interval 11 the data stream is at the zero level and the clock is at the one level, and so the Manchester encoded data is at a one level. During the clock pulse 12 the data are at a one level while the clock is at a zero level, and so the Manchester encoded data remain at the one level. During one level clock pulse 13 the data remain at their one level, and so the Manchester encoded data revert to a zero level. During the next data intervals, during clock pulses 15-18, the data are at the zero level, and so the Manchester encoded data are of the same waveform as the clock. Study of FIG. 1c shows that its waveform is the result of applying the waveforms of FIGS. 1a and 1b to an exclusive-OR circuit. FIG. 1c is thus the Manchester encoded data of the original data stream of FIG. 1a.

The clock signal has a transition from a one level to a zero level at the beginning of each clock period. Likewise, the clock signal has a transition from a zero level to a one level at the middle of each clock period. Transitions of the originally encoded data can only occur at the beginning of a clock period. Consequently, the Manchester encoded data have a transition, either from logic level zero to logic level one or from logic level one to logic level zero, at the midpoint of each data bit, as can be seen from FIG. 1c. This is known as the mid-bit transition.

Figure 2:
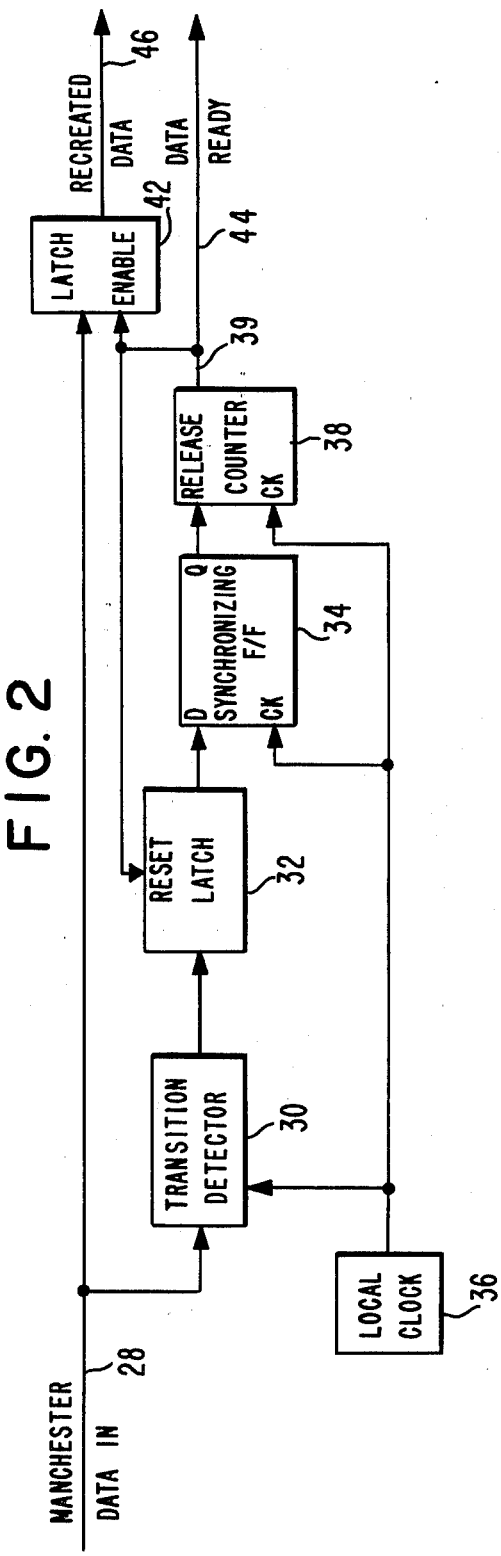
FIG. 2 is a block diagram of the present invention.

The Manchester encoded data of FIG. 1c are transmitted to a receiving station. At the receiving station, the Manchester encoded data are applied by input line 28 to a transition detector 30, as depicted in FIG. 2. Transition detector 30 also receives clock pulses from local clock 36. At each transition of the Manchester encoded data, either from a zero logic level to a one logic level or from a one logic level to a zero logic level, transition detector 30 applies a pulse to latch 32. Assuming that the latch is in its quiescent state, application of the pulse from transition detector 30 activates the latch to apply a pulse to the D input of a synchronizing flip-flop 34. Latch 32 remains in its activated state until it receives a pulse at its reset input.

Local clock 36 has a pulse rate eight times as great as the data bit rate, and thus eight times as great as the pulse rate of the clock depicted in FIG. 1b. FIG. 1d depicts the clock pulses from local clock 36. These pulses are applied to the clock input of flip-flop 34 and to the clock input of counter 38. Because the D input of flip-flop 34 continues to receive a signal from latch 32, the clock pulses keep flip-flop 34 set.

When flip-flop 34 is set by the output from latch 32 and the Q output of flip-flop 34 releases counter 38 which then starts counting the pulses from local clock 36. Thus, after detection of a mid-bit transition by transition detector 30, counter 38 commences counting pulses from local clock 36. On counting the sixth clock pulse, depicted in FIG. 1d by pulses 40a, 40b, . . . counter 38 applies a pulse on line 39 to the enable input of latch 42 and to the reset input of latch 32. This resets latch 32, terminating the signal applied to the set input of flip-flop 34. At the next pulse from local clock 36, flip-flop 34 is reset, terminating the signal to the Release input of counter 38. This presets the counter to the right point for the next cycle of operation and terminates the pulse on line 39. The Manchester encoded data on input line 28 is applied to the signal input of latch 42, and on termination of the pulse on line 39, latch 42 is enabled to sample that Manchester encoded data. The signal on output line 46 of latch 42 is the recreated data stream of FIG. 1e. The output from counter 38 is also applied to output line 44 as a signal indicating that a data bit is available on output line 46.

The output pulse on line 39 from counter 38 is initiated by the sixth pulse of local clock 36 after the logic level transition on input line 28. Since local clock 36 has a pulse rate eight times the data bit rate, the sixth pulse following a mid-bit transition occurs one-fourth of the way into the next pulse interval. When the decoder is first activated, transition detector 30 may detect a transition occurring at the start of a pulse interval rather than a mid-bit transition. The next mid-bit transition will be missed by latch 32 because the latch will not have been reset since storage of the transition at the start of the pulse interval. However, once a transition occurs on the actual data of FIG. 1a, there will be no transition of the Manchester encoded data at the start of the next pulse interval, and so the decoder will next detect the following mid-bit transition. Latch 32 then masks transitions at the start of data intervals, causing those transitions to have no effect on the decoder, and so once a transition occurs in the actual data, the decoder is synchronized on the mid-bit transitions.

FIG. 1d depicts for the first data interval all eight of the pulses from local clock 36. The sixth clock pulse is indicated by pulse 40a. For subsequent data intervals only the sixth clock pulse 40b, 40c, ... is shown in FIG. 1a. During the sixth local clock pulse the sampling of the Manchester data occurs, and the output of latch 42 thus becomes, or remains, a signal of a logic level the same as the logic level of the Manchester encoded data at that sampling time. Thus, at the first one of the sixth clock pulses of FIG. 1d, designated as pulse 40a, the Manchester encoded data have a logic level one, and, accordingly, the recreated data stream at the output of latch 42, which is depicted in FIG. 1e, assumes a logic level one. At the next sixth clock pulse 40b, the Manchester encoded data of FIG. 1c are a logic level zero. Therefore, the recreated data stream changes from logic level one to logic level zero. During sixth local clock pulse 40c the Manchester encoded data are again a logic level zero, and so the recreated data stream of FIG. 1e remains a logic level zero. During sixth clock pulse 40d, the Manchester encoded data are a logic level one, and the recreated bit stream becomes a logic level one. Study of FIGS. 1c, 1d, and 1e shows that at each sampling time 40a, 40b, ... the logic level of the recreated bit stream depicted in FIG. 1e becomes, or remains, the same as the logic level of the Manchester encoded data of FIG. 1c.

Comparison of FIG. 1e with FIG. 1a shows that the recreated bit stream of FIG. 1e is identical in waveform with the original data stream of FIG. 1a. However, the recreated data stream of FIG. 1e lags behind the original data stream of FIG. 1a by an interval equal to one-fourth of a bit interval, since the sampling of the Manchester encoded data occurs at a point one-fourth of a data bit interval after the start of each bit interval.

Figure 3:
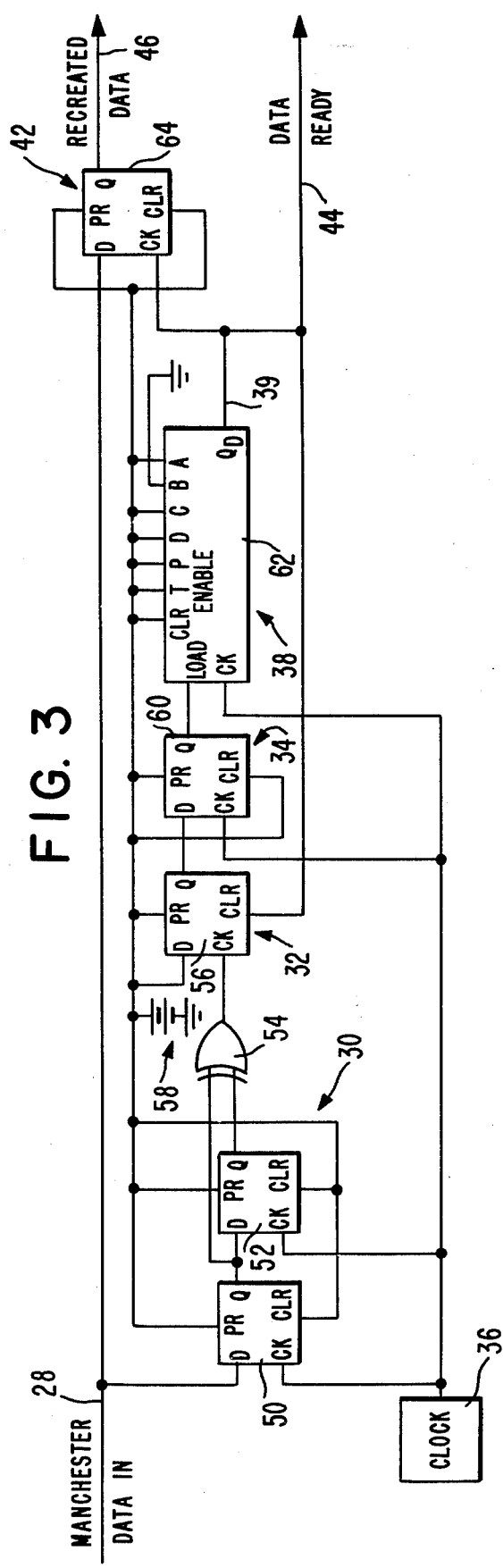
FIG. 3 is a lower level block diagram of the decoder of FIG. 2, in accordance with the present invention.

FIG. 3 is a block diagram of circuitry providing one implementation of the decoder depicted in FIG. 2. The Manchester encoded data on input line 28 are applied to the D input of D-type flip-flop 50. The Q output of flip-flop 50 is tied to the D input of flip-flop 52. Flip-flops 50 and 52 have their preset inputs and their clear inputs connected to positive voltage source 58. The output of local clock 36 is connected to the clock inputs of flip-flops 50 and 52. Exclusive-OR gate 54 has its first input tied to the Q output of flip-flop 50 and its second input tied to the Q output of flip-flop 52. Flip-flops 50 and 52 and exclusive-OR gate 54 make up a transition detector 30.

When a logic level zero to logic level one transition is received on input line 28, the D input of flip-flop 50 goes to a logic level one, and at the next positive-going pulse from clock 36, flip-flop 50 sets to apply a logic level one signal to one input of exclusive-OR gate 54. Since flip-flop 52 is then applying a logic level zero signal to the second input of gate 54, the gate provides an output signal. The logic level one signal from flip-flop 50 is also applied to the D input of flip-flop 52, and so on the next positive-going pulse from clock 36 flip-flop 52 sets to apply a logic level one signal to the second input of exclusive-OR gate 52. Consequently, the output from gate 54 terminates.

Similarly on receipt of a logic level one to logic level zero transition, on input line 28, the D input of flip-flop 50 goes to logic level zero, and on the next pulse from clock 36 flip-flop 50 resets, bringing its Q output to logic level zero. Exclusive-OR gate 54 then provides an output. On the next pulse from clock 36, flip-flop 52 also resets, bringing its Q output to logic level zero, and so the output from exclusive-OR gate 54 terminates. Thus, at each transition of the received Manchester encoded data, exclusive-OR gate 54 provides an output pulse of a duration equal to the duration of one cycle from local clock 36.

The output from exclusive-OR gate 54 is applied to the clock input of D-type flip-flop 56. The D input and the preset input of flip-flop 56 are tied to positive voltage source 58. D-type flip-flop 56 comprises transition latch 32. The Q output of flip-flop 56 is tied to the D input of D-type flip-flop 60, which has its preset and clear inputs connected to voltage source 58. The output of local clock 36 is connected to the clock input of flip-flop 60. Flip-flop 60 thus comprises synchronizing flip-flop 34 of FIG. 2.

The Q output of flip-flop 60 is connected to the load input of synchronous binary counter 62, which has its clock input connected to receive the local clock pulses from clock 36. Positive voltage source 58 is connected to the clear input, the enable T input, the enable P input, the A input, the C input, and the D input of binary counter 62, while the B input of the counter is tied to ground. Synchronous binary counter 62, therefore, forms the counter 38 of FIG. 2.

The D output of binary counter 62 is connected by line 39 to output line 44 to provide the data ready signal to the utilizing equipment. The D output of binary counter 62 is connected to the clear input of flip-flop 56 and to the clock input of D-type flip-flop 64. The preset and clear inputs of flip-flop 64 are tied to positive voltage source 58. The Manchester encoded data on input line 28 are applied to the D input of flip-flop 64. Flip-flop 64, thus, forms latch 42 of FIG. 2, with the Q output of the flip-flop providing on line 46 the recreated data, as depicted in FIG. 1e.

The decoder depicted in FIG. 3 can be implemented from readily available TTL circuitry. Thus, the various logic components of FIG. 3 can be formed from the following TTL circuits:

| Component | Circuit |
| --- | --- |
| Exclusive-OR Gate 54 | 74LS86 |
| Flip-flops 50, 52, 56, 60, 64 | 74LS74 |
| Synchronous counter 62 | 74LS161 |
| Voltage source 58 | +5 volts |

Other suitable components could, of course, be utilized.

In the quiescent condition of the circuit of FIG. 3, the Q outputs of flip-flops 56, 60, and 64 are low or logic level zero. The low signal applied to the load input of binary counter 62 presets and holds the counter at a count of 13 in which the D output of the counter is high or logic level one. Clock 36 is providing pulses at a rate eight times the data bit rate, as depicted in FIG. 1d. When a logic level transition occurs on input line 28, the logic level at the D input of flip-flop 50 changes. On the next positive-going pulse from local clock 36, flip-flop 50 changes state, and exclusive-OR gate 54 provides an output pulse which lasts until the second positive-going pulse from clock 36. The output from gate 54 sets flip-flop 56, and its Q output is applied to the D input of flip-flop 60 so that the second positive-going pulse from clock 36 sets flip-flop 60. The Q output of flip-flop 60 releases counter 62. Four pulses from clock 36, i.e., the sixth clock pulse after the transition on input line 28, then bring counter 62 to a count of zero, causing the D output of the counter to go a logic level zero. The logic level zero signal resets flip-flop 56 which forms the transition latch 32. At the next positive-going pulse from clock 36, the Q output of flip-flop 60 goes low, returning and holding counter 62 at a count of 13. This causes the D output of counter 62 to go high, and the high level at the clock input of flip-flop 64 enables the flip-flop to sample and store the logic level of the Manchester encoded data applied to the flip-flop D input by line 28. This logic level one signal from the D output of counter 62 also is applied on output line 44 as the Data Ready signal. Further, the high level from the D output of counter 62 enables flip-flop 56 to store the next transition detected by exclusive-OR gate 54.

The Manchester decoder of the present invention provides excellent performance without filters or complicated phase lock loops. It is simple to implement and can utilize a clock of comparatively loose tolerance. It provides good noise immunity and good operation, even with moderate signal jitter. Since the Manchester encoded data are sampled at a steady state level, they can be filtered more effectively than with other techniques. The system automatically synchronizes on the mid-bit transitions by detecting a transition after sampling.

Local clock 36 has been described as a clock having a rate eight times as great as the data bit rate. This clock rate provides good jitter immunity and overcomes any differences between the local clock in the decoder and the clock at the encoder. Utilizing a local clock having a rate eight times the data bit rate permits handling, for example, of a 4 MHz data rate with a 32 MHz local clock. Faster data rates can be accommodated by utilizing a faster local clock.

Although the present invention has been described with reference to a preferred embodiment, modifications, rearrangements, and substitutions can be made without departing from the scope of the invention.

What is claimed is:

1. A method of decoding Manchester encoded data to recreate an original data stream, said method comprising:

detecting each mid-bit transition in the Manchester encoded data;

commencing at each mid-bit transition time measuring a time interval substantially equal to three-fourths of the data bit interval to determine a sampling point;

sampling the Manchester data at each sampling point; and causing the logic level of the recreated data stream to be the same as the logic level of the Manchester encoded data at the sampling point.

2. A method as claimed in claim 1 in which the time intervals are measured by counting clock pulses from a clock having a pulse rate which is an integral multiple of the bit rate of the original data stream.

3. Apparatus for decoding Manchester encoded data to recreate an original data stream, said apparatus comprising:

a transition detector for detecting each mid-bit transition in the Manchester encoded data;

means for measuring a time interval commencing with each mid-bit transition and extending for a time substantially equal to three-fourths the data bit interval to determine a sampling point;

means for sampling the Manchester encoded data at each sampling point, and means for generating a data stream having a logic level at each sampling point the same as the Manchester encoded data logic level at the sampling point.

4. Apparatus as claimed in claim 3 in which said measuring means comprises a clock having a pulse rate which is an integral multiple of the bit rate of the original data stream and a counter for counting clock pulses from said clock to generate a sampling point signal on generation of a number of pulses indicating passage of three-fourths of a data bit interval since detection of a transition by said transition detector.

5. Apparatus as claimed in claim 4 in which said transition detector comprises a first flip-flop which is toggled by the first clock pulse from said clock after a transition in the Manchester encoded data, a second flip-flop which is toggled by the second clock pulse from said clock after the transition in the Manchester encoded data, and an exclusive-OR gate having a first input connected to the output of said first flip-flop and a second input connected to the output of said second flip-flop.

* * * * *